United States Patent [19]

Kuntz et al.

[11] 3,999,623
[45] Dec. 28, 1976

[54] FRAME DISTORTION RELIEF STEERING CONTROL SYSTEM

[75] Inventors: Leland E. Kuntz, Arlington Heights, Ill.; Royal R. Hawkins, Bloomington, Minn.

[73] Assignee: Honeywell Inc., Minneapolis, Minn.

[22] Filed: Aug. 20, 1975

[21] Appl. No.: 605,946

[52] U.S. Cl. .............................. 180/142; 404/84; 172/4.5
[51] Int. Cl.² ........................................ B62D 5/06
[58] Field of Search ............ 180/79.2 R, 6.48, 6.5, 180/141, 142, 143; 404/84; 172/2, 3, 4.5, 7, 9

[56] References Cited
UNITED STATES PATENTS

| | | | |
|---|---|---|---|
| 3,029,715 | 4/1962 | Bowen | 404/84 |
| 3,857,577 | 12/1974 | Kuntz | 280/6.1 |

*Primary Examiner*—Robert R. Song
*Assistant Examiner*—R. Schrecengost
*Attorney, Agent, or Firm*—Trevor B. Joike

[57] ABSTRACT

A steering control system, for a land vehicle which is supported by right and left side propelling means for independently driving the vehicle, comprises a steering control apparatus for turning the right and left side propelling means for steering the vehicle and a frame distortion sensor which relieves any stress on the vehicle frame by controlling the speeds at which the left and right side propelling means drive the vehicle.

20 Claims, 2 Drawing Figures

3,999,623

FRAME DISTORTION RELIEF STEERING CONTROL SYSTEM

BACKGROUND OF THE INVENTION

This invention relates to the steering of a land vehicle and particularly relates to those four-post vehicles which are steered by a combination of turning the tracks or wheels of the machines and of driving those tracks or wheels at differential speeds.

Steering control systems, particularly automatic steering control systems as in U.S. Pat. No. 3,848,690, for land vehicles are known in the prior art. Moreover, U.S. Pat. No. 3,917,015 shows a system for steering a vehicle by turning the tracks or wheels of the vehicle and operating the tracks or wheels on the right side at a different speed than those on the left side. However, none of the systems known in the art relieve the distortion on the frame caused by the steering of the vehicle. Although U.S. Pat. No. 3,857,577 shows a system for measuring or sensing frame distortion for controlling the slope of the working member of the machine, it has not been suggested that the distortion on the frame of the machine can be relieved or minimized by sensing that distortion and making the proper adjustments in the steering control system.

SUMMARY OF THE INVENTION

The present invention compensates for distortion of the frame of a land vehicle by providing an apparatus for supplying a signal dependent upon that distortion and utilizing that signal to control the steering of the vehicle such that the distortion is relieved, minimized or eliminated.

DETAILED DESCRIPTION OF THE INVENTION

Figure 1:
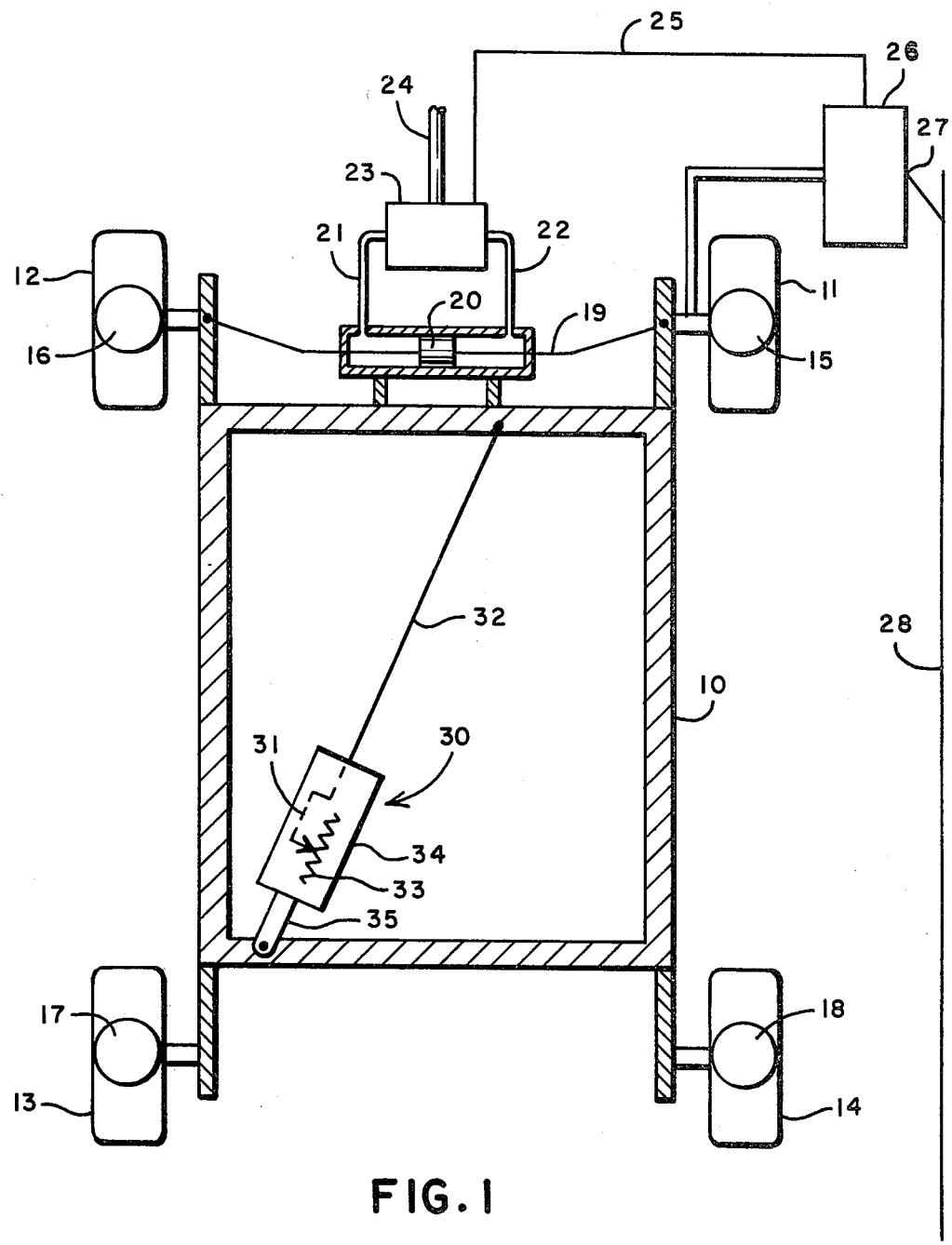
FIG. 1 shows a schematic illustration of the machine frame and propelling means along with the steering sensor used to turn the propelling means to steer the vehicle.

In FIG. 1, the machine frame 10 is driven along its line of flight by propelling means 11, 12, 13 and 14, which may take the form of tracks or wheels, and the propelling means 11–14 are driven by respective motors 15, 16, 17, and 18. A tie-rod 19 is used to turn the front propelling means 11 and 12, about respectively generally vertical axes, to steer the vehicle but it is to be understood that either the front propelling means, the back propelling means or both the front and back propelling means may be turned, about generally vertical respective axes, to steer the vehicle.

The tie-rod 19 is driven by a piston 20 which is supplied with hydraulic fluid by pipes 21 and 22. The hydraulic fluid which flows through pipes 21 and 22 is controlled by a valve 23 having an inlet pipe 24, and valve 23 is controlled over an electrical cable 25 from a steering sensor 26. The steering sensor 26 has a follower 27 which follows an external reference, such as a stringline 28.

The distortion on the machine frame 10 is sensed by a transducer 30 which may take the form of a potentiometer having a wiper arm 31 driven by a rod 32 attached to the front of the vehicle and a resistance 33 housed in a container 34 supported by a bracket 35 to the rear of the frame. As the machine frame distorts, the arm 31 will wipe over the resistance 33 to give an indication of the amount of the distortion which the machine frame 10 is experiencing.

Figure 2:
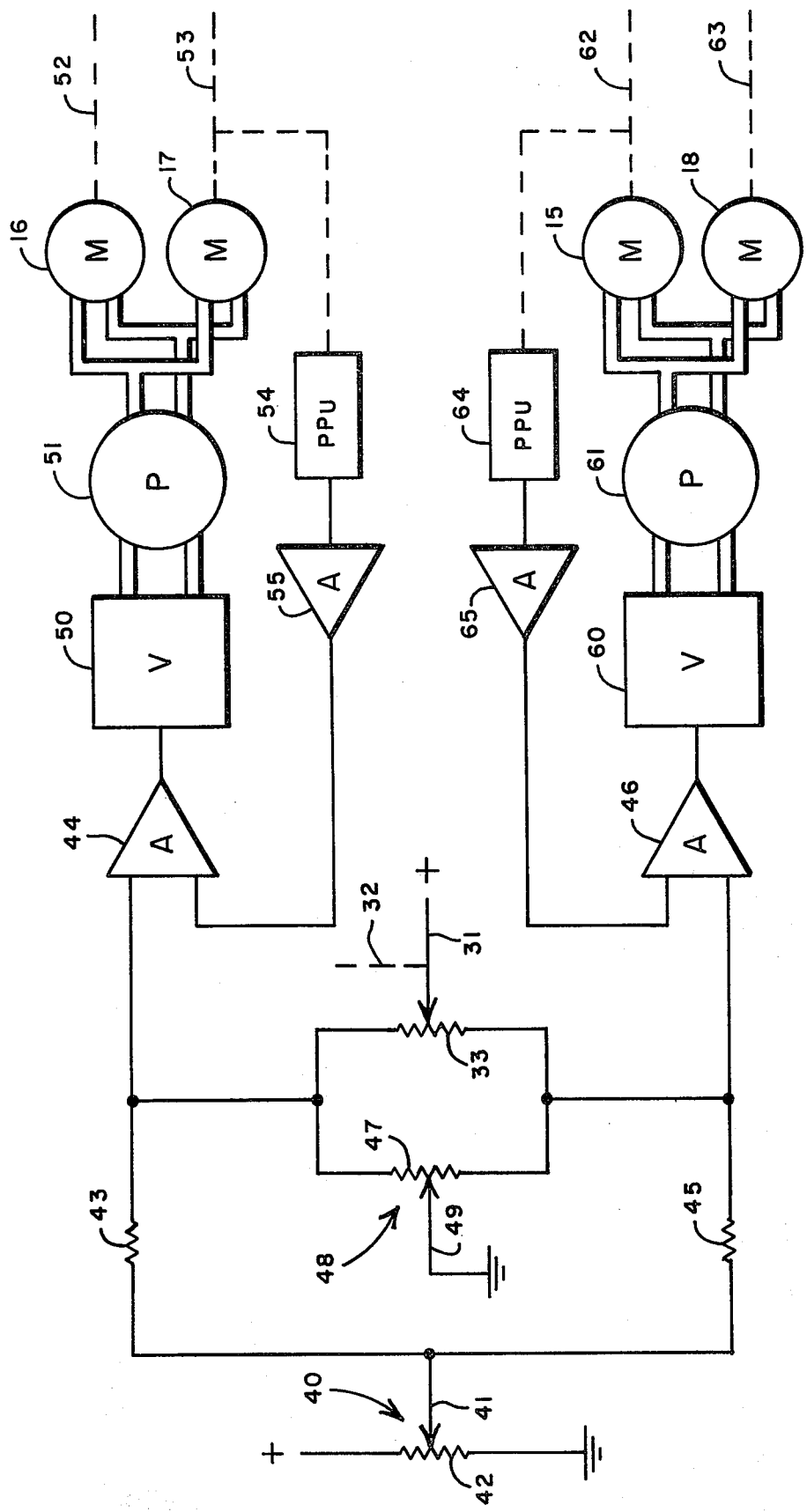
FIG. 2 shows a schematic illustration of the circuitry used to relieve the distortion of the machine frame.

The wiper arm 31, rod 32 and potentiometer 33 are shown in the circuit diagram of FIG. 2. In FIG. 2, a speed control means 40 which may take the form of a potentiometer having a wiper arm 41 and a resistance 42 is shown for controlling the speed of the right and left propelling means. Resistance 42 is connected between a source, which may be a positive source, and a reference potential, which may be ground, and the wiper arm is connected from the resistance 42 through a first resistor 43 to one input terminal of an amplifier 44 and through a second resistance 45 to one input terminal of an amplifier 46. Connected between the junction of the resistor 43 and the amplifier 44 and the junction of resistor 45 and the amplifier 46 is a resistance 47 of a manual steering control means or potentiometer 48. The steering control potentiometer 48 has a wiper arm 49 connected between resistance 47 and ground.

In parallel with the resistance 47 is the resistance 33 of the distortion sensor 30. The wiper arm 31 of the distortion sensor 30 is connected to a source of potential which may be positive. The output from the amplifier 44 drives a valve 50 which controls the output from a pump 51 as by controlling its swash plate. The output from pump 51 is supplied to hydraulic motors 16 and 17 to control the speed at which the left side side of the vehicle is driven. The hydraulic motor 16 has an output shaft 52 for driving the propelling means 12 and the hydraulic motor 17 has an output shaft 53 for driving the propelling means 13. A pulse pickup unit, which may take the form of a magnetic pickup 54, senses the speed at which the output shaft 53 rotates and provides a signal through an amplifier 55 to the other input of amplifier 44. This signal is dependent upon the speed at which the left side of the vehicle is driven. This feedback mechanism is designed to insure that the left side of the machine is driven at the speed dictated by the first input from resistor 43 to the amplifier 44.

The output from amplifier 46 drives a valve 60 which controls the output from a pump 61. The output from the pump 61 drives the hydraulic motors 15 and 18 having respective output shafts 62 and 63 to drive their associated propelling means 11 and 14. A pulse pickup unit 64 senses the speed at which the shaft 62 rotates and provides an input through amplifier 65 to the other input terminal of amplifier 46. The output from amplifier 65 provides an indication of the speed at which the right side of the vehicle is being driven. The purpose of this feedback is to insure that the right side of the vehicle is being driven at the speed dictated by the input to amplifier 46 from resistor 45.

In operation, as the external datum or reference 28 requires a change in direction of the vehicle, the wiper arm 27 will move accordingly to cause the sensor 26, which may take the form of a W895A sensor manufactured by Honeywell Inc. or the system according to U.S. Pat. No. 3,674,094, to drive valve 23 to in turn drive the tie-rod 19 which turns the propelling means 11 and 12. As the propelling means 11 and 12 turn and begin to steer the vehicle, the frame 10 of the vehicle may experience frame distortion. If the frame distorts, the rod 32 will drive the wiper arm 31 over the resistance 33 to adjust the inputs to amplifiers 44 and 46 relatively. This relative adjustment increases the speed of one side of the vehicle by way of increasing the speeds of the appropriate propelling means and decreases the speed of other side of the vehicle by decreasing the speed of the appropriate propelling means to thereby relieve the frame distortion.

The vehicle can be manually steered by adjusting the wiper arm 49 which will have substantially the same effect as the movement of the wiper arm 31. The speed of the vehicle can be changed by moving the wiper arm 41 over resistance 42. The amplifiers 44 and 46 are thereby controlled in unison to either increase or decrease the speed of the hydraulic motors 11–14 in the same direction to control the speed of the vehicle.

The embodiments of the invention in which an exclusive right or property is claimed are defined as follows:

1. A steering control system for a land vehicle having left side propelling means and right side propelling means and further having a distortable frame wherein said system is arranged to reduce or eliminate frame distortion which may occur in said distortable frame, said system comprising:
    first means adapted to control the steering of the vehicle, said steering being a source of said frame distortion;
    second means responsive to said frame distortion for producing an output dependent upon said frame distortion of said distortable frame; and,
    third means connected to said second means and responsive to said output of said second means and adapted to control said frame distortion of said distortable frame.

2. The system of claim 1 wherein said third means comprises left side control means connected to said second means and adapted to drive said left propelling means and right side control means connected to said second means and adapted to drive said right side propelling means.

3. The system of claim 1 wherein said second means comprises a potentiometer having a wiper arm adapted to be connected to one side of said distortable frame and a resistance adapted to be connected to another side of said distortable frame.

4. The system of claim 3 wherein said third means comprising left side control means connected to said resistance and adapted to drive said left propelling means and right side control means connected to said resistance and adapted to drive said right side propelling means.

5. The system of claim 4 wherein said left side and right side control means each comprise an amplifier having a first input connected to said resistance and a second input connected to a means for supplying a signal to said amplifier dependent upon the speed of a respective one of said propelling means.

6. The system of claim 1 wherein said first means comprises automatic steering sensing means responsive to an external steering reference and adapted to turn said propelling means to steer said vehicle.

7. The system of claim 6 wherein said third means comprises left side control means connected to said second means and adapted to drive said left propelling means and right side control means connected to said second means and adapted to drive right side propelling means.

8. The system of claim 6 wherein said second means comprises a potentiometer having a wiper arm adapted to be connected to one side of said distortable frame and a resistance adapted to be connected to another side of said distortable frame.

9. The system of claim 8 wherein said third means comprises left side control means connected to said resistance and adapted to drive said left side propelling means and right side control means connected to said resistance and adapted to drive said right side propelling means.

10. The system of claim 9 wherein said left side and right side control means each comprise an amplifier having a first input connected to said resistance and a second input connected to a means for supplying a signal to said amplifier dependent upon the speed of an associated one of said propelling means.

11. A steering control system for a land vehicle having left side propelling means and right side propelling means and further having a distortable frame wherein said system is arranged to reduce or eliminate frame distortion which may occur in said distortable frame, said system comprising:
    steering control means for controlling the steering of said vehicle, said steering being a source of said frame distortion;
    distortion responsive means responsive to said frame distortion for producing an output dependent upon said frame distortion of said distortable frame; and,
    distortion relief means connected to said distortion responsive means and responsive to said output of said distortion responsive means for relieving said frame distortion of said distortable frame.

12. The system of claim 11 wherein said distortion relief means comprises left side control means connected to said distortion responsive means to drive said left propelling means and right side control means connected to said distortion responsive means to drive said right side propelling means.

13. The system of claim 11 wherein said distortion responsive means comprises a potentiometer having a wiper arm connected to one side of said distortable frame and a resistance connected to another side of said distortable frame.

14. The system of claim 13 wherein said distortion relief means comprises left side control means connected to said resistance to drive said left propelling means and right side control means connected to said resistance to drive said right side propelling means.

15. The system of claim 14 wherein said left side and right side control means each comprise an amplifier having a first input connected to said resistance and a second input connected to a means for supplying a signal to said amplifier dependent upon the speed of a respective one of said propelling means.

16. The system of claim 11 wherein said first means comprises automatic steering sensing means responsive to an external steering reference and adapted to turn said propelling means to steer said vehicle.

17. The system of claim 16 wherein said steering control means comprises left side control means connected to said distortion responsive means to drive said left propelling means and right side control means connected to said distortion responsive means to drive right side propelling means.

18. The system of claim 16 wherein said distortion responsive means comprises a potentiometer having a wiper arm connected to one side of said distortable frame and a resistance connected to another side of said distortable frame.

19. The system of claim 18 wherein said distortion relief means comprises left side control means connected to said resistance to drive said left side propelling means and right side control means connected to said resistance to drive said right side propelling means.

20. The system of claim 19 wherein said left side and right side control means each comprise an amplifier having a first input connected to said resistance and a second input connected to a means for supplying a signal to said amplifier dependent upon the speed of an associated one of said propelling means.

* * * * *